FIG. I.
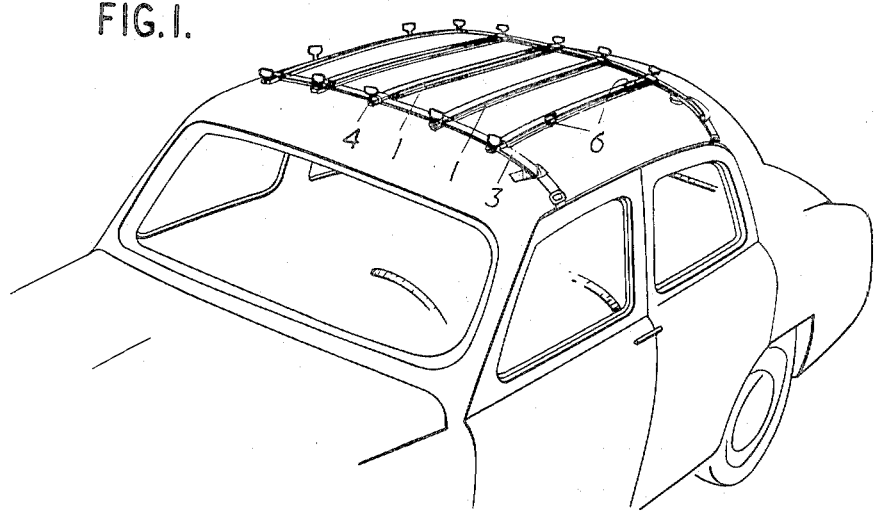
FIG. 2.
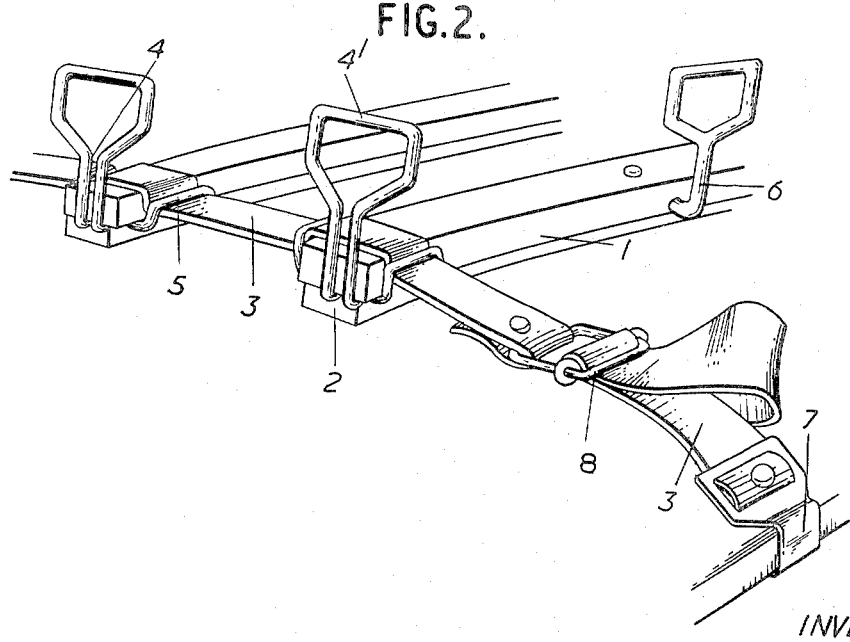
INVENTORS
CARLO BARASSI &
ROBERTO MENGHI
By Young, Emery & Thompson
ATTORNEYS

United States Patent Office 2,753,095
Patented July 3, 1956

2,753,095
FOLDABLE LUGGAGE-CARRIER

Carlo Barassi and Roberto Menghi, Milan, Italy, assignors to Pirelli S. P. A., Milan, Italy Application May 29, 1952, Serial No. 290,788

Claims priority, application Italy June 7, 1951

3 Claims. (Cl. 224—42.1)

The present invention concerns a luggage-carrier capable of being easily fixed onto the roof of motorcars of any kind, wherefrom it can be completely removed in a very short time without leaving any marks. When it is not being used, it can be easily placed in the interior of the car or in the motor trunk.

Therefore, it can be suitably employed in the travels from one place to another one and it can be removed, together with the luggage, at the end of the trip.

The luggage-carrier comprises a plurality of substantially parallel rods spaced at predetermined intervals and lying on the upper face of the car roof parallel to any of the side edges thereof, said rods being capable of fitting with their lower face to the crowned upper face of the roof in the respective directions, at least two straps uniting each of the corresponding extremities of said rods and anchorable in their turn at their ends to fixed points onto the body of the motorcar; connecting means between said straps and the ends of said rods and anchoring means for the fixing means of the luggage to the luggage-carrier located at the extremities of said rods and along the two end rods of said plurality of rods.

The said rods can be indifferently made of metal, wood, rubber, synthetic material or many of these materials variously combined, the thickness of these rods being at will such that they may be rigid or also flexible. In any case, and more particularly in the first one, their lower faces and in some cases also their upper faces can be provided with a coating of elastic material, for instance a rubber strip or a sponge rubber strip, of suitable thickness and section, in order to improve the fitting and adherence of the luggage-carrier to the car roof and of the luggage to the luggage-carrier, respectively.

When the rods are made of a rigid material, they can be divided into elements in alignment and connected together by means of hinges. Thus, a more efficient fitting of the single rods of the luggage-carrier to the crowned roof of the car is obtained, while the volume of the luggage-carrier, when it is folded up to be stored away, is remarkably reduced.

The straps, which connect the extremities of said rods are preferably elastic and comprise means for adjusting their length. Moreover, the connecting means between straps and rods are shaped so as to serve in the same time for receiving the ropes that are knotted thereon for fixing the luggage.

An embodiment of the invention is illustrated by way of example in the accompanying drawings, in which:

Fig. 1 is a perspective view of the luggage-carrier mounted on the roof of a motorcar;

Fig. 2 is a partial view on enlarged scale showing some details of the luggage-carrier.

The rods 1, in a suitable number, and having a length adequate to the surface area of the car roof are made of a material flexible enough as to fit to the crowned roof of the car and have a flat shaped section, that is they are remarkably wide as compared with their thickness.

The lower face of said rods is coated with a strip 2 of elastic material. The extremities of the rods are interconnected through a somewhat elastic superposed strap 3 by means of L-shaped hooks 4 (Fig. 2), one arm of which bent as an U, forms the bridges 5 which follow without going out therefrom the upper plane of the rods 1 so as to fix the strap between the upper plane of the rods and the bridges 5. The other arm of the L-shaped hooks forms instead an eyelet 4' which serves for receiving the knots of the ropes fixing the luggage. To the two end rods 1 hooks 6 are fixed which have the same purpose.

The extremities of the strap 3 are provided with hooks 7 which are anchored in the gutter of the sides of the carriage body. In the strap 3 is moreover inserted a buckle 8 serving to adjust the length thereof.

It appears clear that the embodiment of the invention above described and illustrated in the drawings is a preferred embodiment thereof, but not the only one which can be made without departing from the principles underlying the invention, any other embodiment of the invention being therefore considered as covered by the protection afforded the invention.

What we claim is:

1. A foldable luggage-carrier for detachable mounting on the crowned roof of a car, comprising a plurality of rods adapted to lie on the upper surface of the car roof, substantially parallel to one of the side edges thereof and in spaced apart relation, said rods having lower surfaces capable of fitting with the crowned upper surface of the roof, at least two straps connecting the corresponding ends of said rods, means for anchoring each end of said straps to fixed points on the sides of the car, connecting means between said straps and said rods constructed to allow for mutual sliding between each rod and the straps to vary the spacing between adjacent rods, anchoring means forming a part of said connecting means for securing luggage to the luggage-carrier; each of said connecting means and anchoring means comprising an L-shaped hook having its horizontal arm bent into inverted U's to form bridges for the strap to pass through and be clamped between the upper surface of the rod and the bridges, and having its vertical arm bent into the shape of an eyelet for receiving a rope used in fixing the luggage on the carrier.

2. A foldable luggage-carrier as set forth in claim 1, wherein the bight portions of the U's are below the upper surface of the rod so as to exert a clamping action on the strap passing over the rod, and hooks on the end rods positioned centrally thereof for receiving a rope used for fixing the luggage on the luggage-carrier.

3. A foldable luggage-carrier as set forth in claim 2, in which the lower surfaces of each rod comprises a strip of elastic material extending throughout the length of the rod.

References Cited in the file of this patent

UNITED STATES PATENTS

| | | |
|---|---|---|
| 2,119,051 | Le Boeuf | May 31, 1938 |
| 2,387,779 | Strauss | Oct. 30, 1945 |
| 2,639,848 | Burmeister | May 26, 1953 |